ARNE JOHAN ARTHUR ASPLUND
HORST FRANZ SCHOLZ 3,115,504
METHOD FOR PRODUCTION OF FURFURAL
Arne Johan Arthur Asplund, Bromma, and Horst Franz Scholz, Vallingby, Sweden, assignors to Aktiebolaget Defibrator, Stockholm, Sweden, a corporation of Sweden
Filed Feb. 10, 1960, Ser. No. 7,837
Claims priority, application Sweden Feb. 13, 1959
1 Claim. (Cl. 260—347.9)

This invention relates to production of furfural.

More particularly this invention relates to a method and apparatus for production of furfural from pentosans-containing material.

Furfural can be obtained from pentosans-containing raw material by hydrolysis at elevated temperatures.

Methyl furfural can also be obtained from cellulose and the hexoses-containing part of the hemicellulose of vegetable material.

To initiate the reaction there are generally added mineral acids such as diluted sulphuric acid or the organic acids usually present in the material or such organic acids which are produced during the hydrolysis. A condition for the reaction to begin is a predetermined moisture content of the material. If a vegetable material having a moisture content below 15 percent is heated the result is a decomposition of the material whereby pitchy products containing, i.a., phenol and cresol, are formed. Vegetable material and in particular wood when stored for a longer time and also agricultural waste material such as corncorbs, chaffs, olive kernels and sunflower kernels from which oil has been recovered, have usually so low moisture content that the reaction when started will not develop in the desired direction.

One main object of the present invention is to provide a method which in an easy and reliable manner overcomes the difficulties in consideration.

A further object of the invention is to provide an apparatus which the novel method embodying the invention may be carried out in an economic and easily controllable manner.

The invention is based on the discovery that it has proved to be very useful in the production of furfural from raw material of the kind set forth to treat the material if its moisture content is below 50 percent, by moistening and mechanical compression and a subsequent expansion of the material below the surface of a liquid. Thereupon the material is conveyed upwards above the surface of the liquid, excess of liquid being allowed to run off and possibly being expelled by a further slight compression of the material. Said liquid may be constituted by water solely or by water and additional slightly acid chemicals intended to neutralise alkaline components of the vegetable raw material.

Further objects and advantages of the invention will become apparent from the following description of an apparatus for carrying out the method of the invention shown by way of example in the accompanying drawing, which forms part of this specification and in which.

Figure 1:
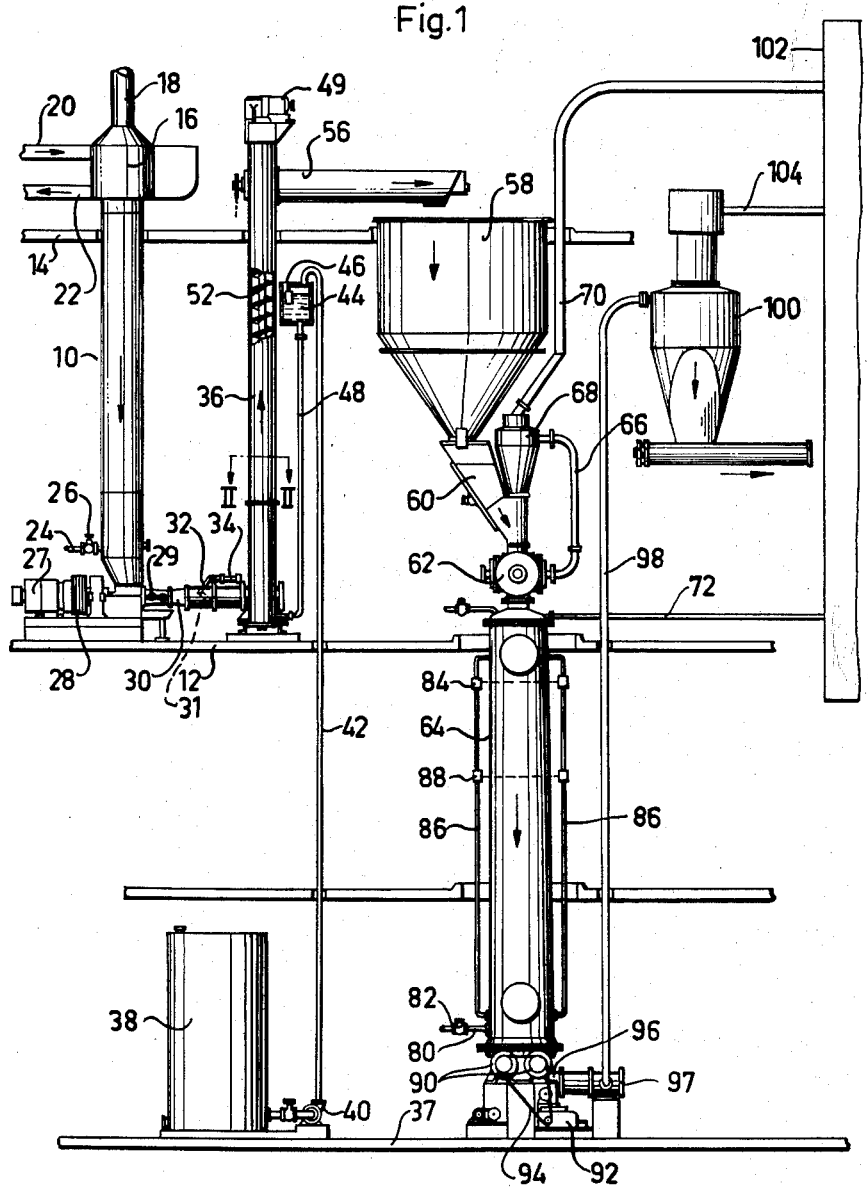
FIG. 1 shows in elevation and partly in section a plant for carrying out the method.

Referring to the drawing, reference numeral 10 denotes a container erected on a flooring 12 and extending vertically upwardly through a flooring 14 located at a higher level. The container 10 has an upper closure member 16 the upper end of which is formed with a steam outlet 18. Raw material such as oak wood chips is supplied to the member 16 from a storage bin (not shown) through a duct 20, whereafter the material falls down into the container 10. If the supply of material is too large, the excess returns through a duct 22 to the storage bin. Passing through the ducts 20 and 22 is a scraping conveyor (not shown). Steam is supplied to the container 10 through a pipe 24 connected to the lower part of the container and provided with a valve 26 and thus flows upwards in the opposite direction to the material descending within the container 10 for the purpose of producing a softening of said material. The container 10 thus serves as a kind of zone for softening by means of steam within which zone the material is gradually heated to a temperature exceeding 70° C. and suitably maintained between 80° and 90° C. and in some cases reaching the boiling point of water at atmospheric pressure. Any excesses of steam may escape through the outlet 18, but the supply of steam through the pipe 24 is controlled so as to avoid such excess as far as possible.

The material softened in the base zone is conveyed by a screw conveyer 29 located in the lower part of the container 10 and driven by an electric motor 27 through a reduction gear 28, into a plug forming tube 30. Inside this tube is disposed a flap 31 which through intermediary of an arm 32 is loaded by a hydraulic servo-motor 34 and thus assists in subjecting the mass of material to high pressure. In this part of the apparatus the material is compressed mechanically so a to expel air and possibly also free water present in the pores of said material.

Mounted on the flooring 12 is a further container 36 which also extends upwardly through the flooring 14. In the container 36 impregnation of the material is effected while the mass of material is simultaneously conveyed up to the higher floor. On a still lower flooring 37 stands a vessel 38 within which a solution of chemicals is prepared and is conveyed by a pump 40 and through a pipe 42 up to a container 44 provided with a level control 46 which ensures that the solution of chemicals is maintained at a predetermined constant level within this container. A tube 48 interconnects the base parts of the containers 44 and 36 and thus in the container 36 a liquid column is formed reaching to substantially the same level as that in the container 44. The chemicals in the solution are preferably non-volatile acids such as diluted sulphuric acid.

When the mass of material compressed strongly for example subjected to a high pressure of 30 to 50 or even to 100 atmospheres in the tube 30 enters the container 36 at its base it will immediately enter a bath of the chemical solution. The material expands towards its orignal volume and the solution is sucked into the pores of the material. The preheating in the base section of the container 10 is intended to facilitate the compression in the plug-forming tube 30 and expansion takes place in the liquid containing part of the container 36 which ensures an extremely good impregnation of the material with the chemical solution.

Figure 2:
FIG. 2 is a section along the line II—II of FIG. 1.

The material is conveyed upwardly within the container 36 preferably by means of two screw conveyors 50, 52 (FIG. 2) driven by an electric motor 49 the conveyors having a pitch preferably of the same magnitude as the diameter of the container and being rotated at a low number of revolutions such as 5 to 15 revolutions per minute. The spacing between the axes of the two screw conveyors should not be substantially larger than the sum of the radii of the screws and may possibly be less in order to produce an effect preventing rotational movement of the material. To the same end partitions 54 may be provided which are individually secured by welding and shaped to the periphery of the screws and designed to fill the areas adjacent the zones where the screws meet or engage one another.

The material is conveyed upwardly by the screws 50, 52 initially below the level of the liquid in the container 36 and leaves the liquid at the top part of the container 36 and is discharged from the container by means of a conveyor 56 extending in a transverse direction and located in the uppermost portion of the container 36. The liquid column in the container 36 is dimensioned so as to produce a relatively high hydrostatic pressure adjacent the base of the container where the compressed material is allowed to expand. This pressure which may be of the order of 3 to 5 metres and may possibly reach 10 metres water column assists in forcing the solution of chemicals into the pores of the material.

This impregnation of the material by the solution of chemicals is followed by a cooking or boiling of the material. The conveyor 56 delivers the impregnated material into a hopper-shaped vessel 58. From there the material falls into a vibrating feeder 60 to a so-called rotating cell feeder 62 having individual pockets separated from one another, the content of material of which is delivered to a vertical digester 64 extending downwardly to the lowest flooring 37 of the plant. The cell feeder is also so constructed as to prevent direct communication between the closed digester 64 and the vibrating feeder 60. The pockets of the cell feeder when moving upwards during rotation contain steam at high pressure which steam escapes through a duct 66 provided with a steam separator 68 to separate any entrained particles of material and thence through a duct 70 for further use as will be described hereinafter. Steam is supplied to the vertical digester 64 at the base through a pipe 80 provided with a control valve 82.

The cell feeder 62 is controlled by a system of two level regulators 84 and 88 which may be adjustably mounted on vertical guides 86 and between which the level of the column of material may fluctuate.

In the digester 64 steam is maintained at a pressure of the order of 8 to 10 kg./cm.$^2$ and at corresponding temperature. During their downward passage within the container 64 the material meets a steam atmosphere and is subjected to cooking in said atmosphere while also being affected by the chemicals with which it was earlier impregnated. The steam which does not escape through the cell feeder is discharged from the top of the digester 64 through a duct 72 for further use as will be described hereinafter.

Adjacent the base of the digester 64 conveyors 90 driven through suitable transmission 94 by an electric motor 92 feed the material to a further conveyor 96 driven by an electric motor and opening into a rotary outlet valve 97 from which the processed material is passed through a conduit 98 to a blow tank 100 after which it is subjected to further treatment in a furfural separation plant 102. The furfural separation plant is of known type preferably as disclosed in the specification of the U.S. Patent 2,862,008 granted November 25, 1958, to G. G. C. Skoogh and G. E. Sävö to which specification reference is made for a more detailed description of the furfural separation plant and its continuous operation.

The steam required in the furfural separation plant 102 is suitably at least partly obtained from the excess of steam escaping through the duct 70 further through the duct 72 connecting the top of the vertical digester 64 with the separation plant and a duct 104 from the blow tank 100.

While one more or less specific embodiment of the invention has been described, it is to be understood that this is for purpose of illustration only, and that the invention is not to be limited thereby, but its scope is to be determined by the appended claim.

What we claim is:

The method of producing furfural from pentosan containing vegetable material selected from the group consisting of agricultural waste products and wood and having a moisture content below 50%, which comprises the steps of pre-dampening the material by first treating it with steam at substantially atmospheric pressure until the material is substantially softened, then mechanically compressing the thus softened material whereby to expel air and any free water still present, thereafter releasing the material from said mechanical compression while submerged under the surface of an aqueous solution of an acidic substance, said release from said mechanical compression causing said material to expand to substantially its original volume and said aqueous solution to be sucked into the pores of the material to impregnate the same with said solution, withdrawing the thus impregnated material from submergence in said solution, then cooking the thus impregnated material in an atmosphere of steam maintaining at relatively high pressure while at the same time subjecting the material to the action of the said aqueous solution utilized in said impregnating step, and recovering the furfural from the thus processed material.

References Cited in the file of this patent

UNITED STATES PATENTS

| | | |
|---|---|---|
| 1,040,842 | Anderson | Oct. 8, 1912 |
| 1,735,084 | Miner et al. | Nov. 12, 1929 |
| 1,919,878 | Brownlee | July 25, 1933 |
| 1,960,812 | Groth et al. | May 29, 1934 |
| 2,059,435 | Brownlee | Nov. 3, 1936 |
| 1,092,800 | Roch | Apr. 7, 1941 |
| 2,818,413 | Nata | Dec. 31, 1957 |

FOREIGN PATENTS

| | | |
|---|---|---|
| 585,772 | Great Britain | Feb. 24, 1947 |
| 808,119 | Great Britain | Jan. 28, 1959 |